United States Patent [19]

Aubry

[11] 4,293,277

[45] Oct. 6, 1981

[54] SUPPLE MOUNTING ARRANGEMENT FOR HELICOPTER ROTOR WITH THROUGH STRIP

[75] Inventor: Jacques A. Aubry, Cabries, France

[73] Assignee: Societe Nationale Ind. Aerospatiale, Paris, France

[21] Appl. No.: 44,365

[22] Filed: Jun. 1, 1979

[30] Foreign Application Priority Data

Jun. 5, 1978 [FR] France .................... 78 16730

[51] Int. Cl.³ .......................................... B64C 27/38
[52] U.S. Cl. ................................ 416/134 A; 416/141
[58] Field of Search .............. 416/134 A, 138 A, 141, 416/230 A

[56] References Cited

U.S. PATENT DOCUMENTS

| | | | |
|---|---|---|---|
| 3,999,887 | 12/1976 | McGuire | 416/134 A |
| 4,008,980 | 2/1977 | Noehren et al. | 416/230 A X |
| 4,047,839 | 9/1977 | Ferris et al. | 416/141 X |
| 4,053,258 | 10/1977 | Mouille | 416/230 A X |
| 4,104,003 | 8/1978 | Mouille | 416/148 X |

*Primary Examiner*—Everette A. Powell, Jr.

[57] ABSTRACT

The stringer of a rotor blade assembly is mounted on the hub plates of a driveshaft by a two pair of conically elastic studs which space the stringer from the plates. The cylindrical sleeve root of the blade shell is mounted to the hub by a resilient ball joint.

11 Claims, 6 Drawing Figures

SUPPLE MOUNTING ARRANGEMENT FOR HELICOPTER ROTOR WITH THROUGH STRIP

The present invention concerns helicopter rotors, and more particularly rotors in which a pair of blades is borne by a single stringer constituted by a flexible and twistable through spar. More particularly, the subject of the present invention is a mounting arrangement of the spar on the end of the rotor in such a way as to create suppleness at this level, in the spar-to-rotor shaft link.

French Pat. No. 72/12.703 by the US firm, United Aircraft, teaches a helicopter rotor arrangement in which each pair of blades is borne by the same stringer, and mounted on the rotor mast by means of two plates, an upper and a lower one, equipped with a groove for reception of the stringer. The latter is curved in its central part corresponding to the zone of attachment on the plates, in association with intermediate parts forming both the form of this stringer portion, and that of the corresponding plate.

French Pat. No. 74/31,664 in the present name of the Applicant, proposes, in a through-spar rotor fixed in its center on the rotor shaft, a linkage of the blade shell on the hub by means of flexible studs mounted on either side of plates forming the hub in the interior of a cylindrical flange, fast with the blade sleeve.

The major drawback of these known arrangements resides in the fact that the through-spars are embedded on the hub, and they result in excessive flutter and drag stresses at the foot of the said strips, which substantially reduces their life. It is not possible to reinforce these spars in any manner whatever without, at the same time, a prohibitive increase in their elastic return couple in torsion, hence in the force to be applied in order to control the pitch.

Various solutions have been proposed to obtain a resilient mounting of the spars on the driveshaft. In French patent application No. 74/37,806 by Boeing, two blades forming separate units are linked together by a flexible "ligature" in the form of a strip, extending through slots formed in transverse flection elements situated on either side of the axis of rotation. These flection elements, made of reinforced plastic, joined together by their ends, are linked to lower and upper plates constituting the hub, by means of spindles passing through the ends.

Based on the same sort of rotor design, in which two blades are interconnected by a plane, flexible arm disposed between two plates, upper and lower, constituting the hub, French patent application No. 76/20,844 by Lord, describes a supple mounting of the arm by means of pivoting blocks through which the arm passes, and a plate of visco-elastic material fixed with the hub and disposed in a plane parallel to the plane containing the linking arm.

U.S. Pat. No. 3,880,551 by Boeing, also contains the flexible "ligature" or arm or flange linking two opposing blades. This linking element is disposed between two profiles of plastic material fixed to the hub, with interposition either of T-shaped flection elements made of resin reinforced with glass fibers, or a flection-torsion element of epoxy resin reinforced with monodirectional glass fibers, in the center of which is embedded the central part of the linking element, to form a supple mounting of this element on the rotary shaft.

In these last three known forms, the spar supporting the blades passes, in its central part, through the supple linking elements to the hub, or is even embedded in the latter; it is, therefore, so to speak, imprisoned by the hub arrangement, which makes the operations of assembly, and particularly, of disassembly, of the blades of a rotor so constituted, very difficult. With such a structure, inspection of the members of the rotor, and their replacement where the case applies, raises serious problems.

It is the object of the present invention to remedy these drawbacks and to create a supple mounting arrangement for rotor blades with through spar which will reduce to an acceptable level the drag and flutter stresses at the root of the spar on the hub (thus avoiding a limitation of its service life), while offering a rational structure facilitating assembly and disassembly, this arrangement also determining in positive fashion the median position of the feet of the blades relative to the hub.

SUMMARY OF THE PRESENT INVENTION

According to the present invention, a resilient mounting arrangement for a helicopter rotor is provided comprising a hub fixed in rotation with the driveshaft and, for each pair of opposing blades, a flexible and twistable spar linked to the hub and comprising a stringer common to the two blades. The blades are each formed by a shell enveloping the spar and fixed with the latter in the region of its outer end. According to the invention, the link between the blades borne by the spar and the hub is insured on the one hand by two sets of laminated studs, placed symmetrically to the axis of rotation of the rotor, and elastically linking the central part of the spar to supporting plates constituting the hub. The axes of the studs are parallel to the axis of rotation, hence perpendicular to the plane of rotation of the blades. A ball joint is provided by means of which the root of each blade rests on the hub, and which allows the latter to make movements of drag, flutter and incidence.

A particularly advantageous form of execution is characterized by the fact that each set of laminated studs is formed of two studs, each constituted by an outer element and an inner element, which are coaxial, linked by a conical, elastic zone, disposed on a single axis perpendicular to the median plane of the strip, on either side of the latter, and resting by one of their elements on the spar and by their other element on a respective plate of the hub, fast with the rotor shaft. Preferably, each laminated stud is engaged in a bore in the corresponding plate on which it rests, by a shoulder on its outer element, while it rests on the spar by its inner element, the plates being held apart by hollow braces situated on either side of the spar, through which pass the linking bolts of the said plates. The laminated studs are then linked together in a given set by cylindrical braces perpendicular to the strip, which pass through the latter, as well as the inner elements of the studs, and in which there pass holding bolts for the spar and the studs.

When the thickness of the central part of the spar is adequate, each laminated stud can also be engaged in a respective bore formed in the spar, on which it rests by a shoulder of its outer element, while it rests on the corresponding plate by its inner element.

Therefore, due to the conical, laminated studs, a relative elasticity is introduced into the link between the through-spar and the hub plates which are fixed with the transmission shaft. The use of conical laminates studs on the one hand leads to a very simple and easily dismountable structure, and on the other hand makes it possible to adjust independently, the stiffnesses in flutter and drag, by acting on the conicity, the thickness, the number and the hardness of the layers of elastomer in the laminate. Furthermore, the ball-joint imposes a well determined median position at the corresponding blade root, the blade being able to execute movements of drag and flutter around the center of articulation, which is advisably placed on the longitudinal axis of the spar, at the point of pseudo-articulation of the latter, and movements of incidence around this axis, which now cannot induce movements of flutter and vice-versa.

In its turn, the ball joint of the root of each blade can advantageously be constituted by an annular collar fixed to the root of the blade shell and presenting a spherical inner surface coaxial to the longitudinal axis of the spar, which rests on the perimeter of an elastic, circular hoop placed in the interior of the spherical surface, coaxially to the axis, and borne by a ring linked to the hub. The latter, which is preferably made in two independent halves, to facilitate assembly, as well as the said collar, can either be fixed directly to the plates of the hub and solid in rotation with the shaft, or fixed to the central part of the spar.

Advantageously, the supple hoop has a composite structure, and is constituted by an annular piece of self-lubricating material, in the form of a circular channel and in contact, by its dorsal part, with the spherical surface of the collar, and by a ring of elastic material lodged in the groove presented by the annular piece and resting on the perimeter of the said ring.

The description which follows, in reference to the drawings attached by way of non-limiting examples, will make possible a clear understanding of how the invention can be applied in practice.

DESCRIPTION OF THE INVENTION

Figure 1:
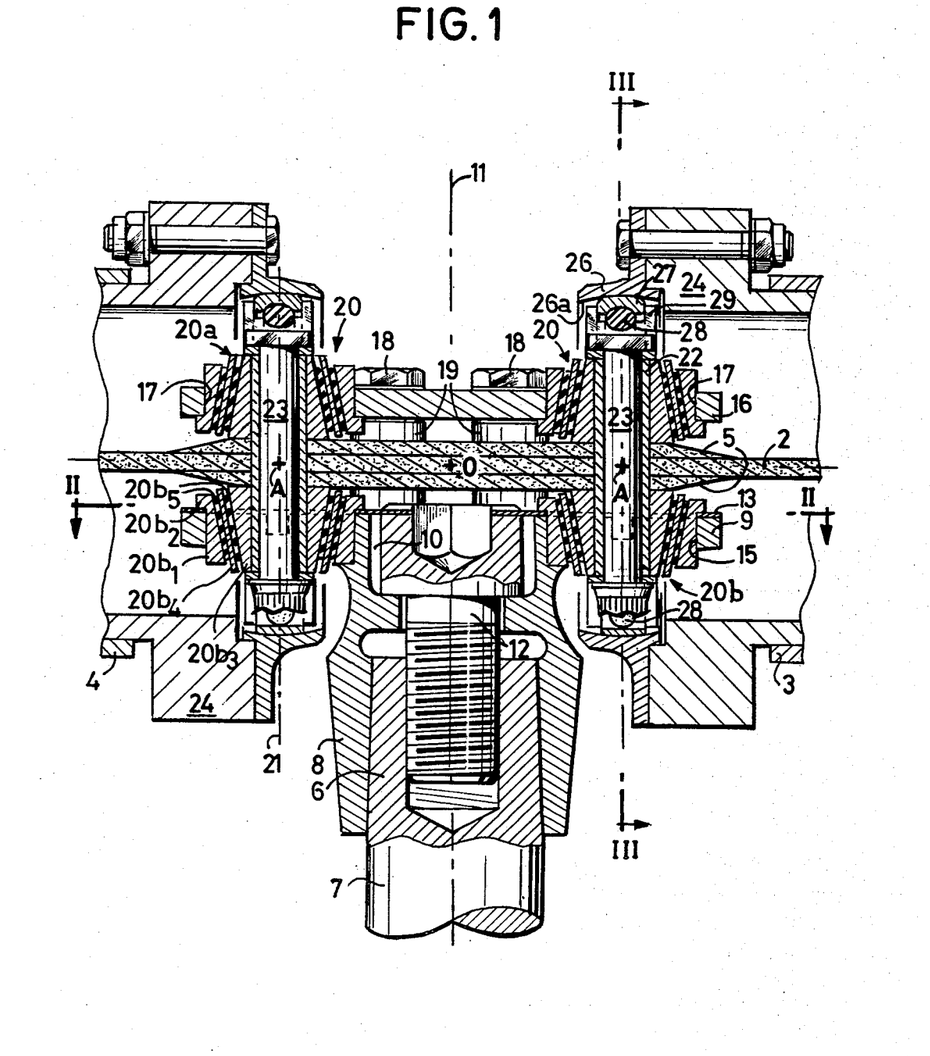
FIG. 1 is a sectional view along the plane defined by the axis of rotation and the longitudinal axis of the through spar of an arrangement according to the invention.
Figure 2:
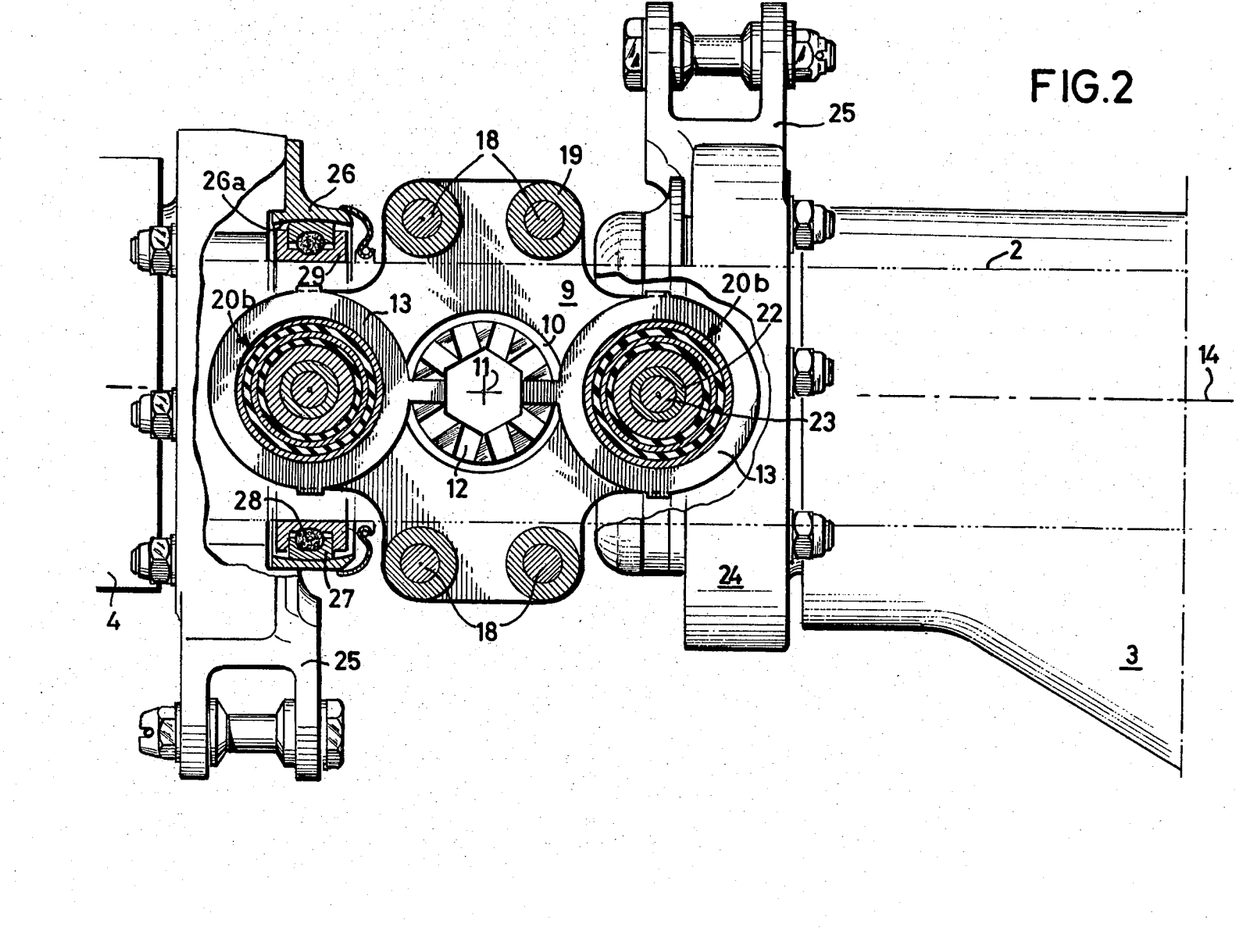
FIG. 2 is a section along line II—II of FIG. 1.
Figure 3:
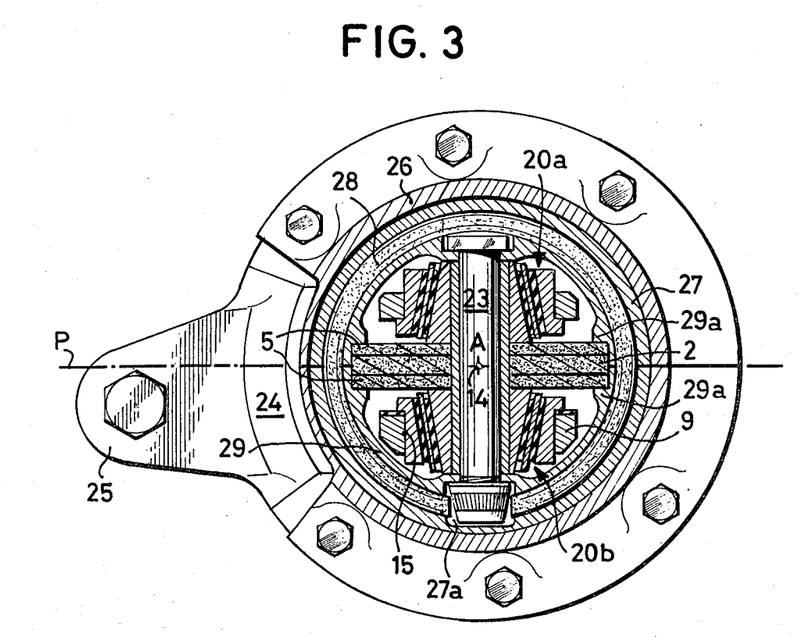
FIG. 3 is a section along line III—III of FIG. 1.

FIGS. 1 to 3, show an elastic mounting arrangement of the two blades of a two-bladed rotor, which could be, for example, a two-bladed tail rotor for a helicopter. This rotor is essentially constituted by a flexible and twistable stringer with a flattened rectangular section, made of glass fibers of high strength and low modulus of elasticity, coated with thermosetting synthetic resin, to form a spar 2 that extends over the full span of the rotor. This through-spar 2 defining a plane P has a center O. The spar 2 links the two blades constituted by shells 3 and 4, only the root of which is represented in FIGS. 1 and 2. The shells 3 and 4 envelope the spar 2 on either side of its central portion and each of them is made fixed with the spar 2 in the region of its outer end, and not in the region of its root. The spar 2 is reinforced in its central position by a double sole 5, likewise made of glass laminate, in such a way as to substantially double the thickness of the spar in the region of the rotor hub.

On the truncated end 6 of the rotor shaft 7 there is fitted the skirt 8 of a lower plate 9 extending perpendicularly to axis 11. In this plate there is formed, first of all, a circular axial recess 10, centered on the axis of rotation 11 of the rotor, which accommodates the head of a large axial screw 12 engaged in a thread cut in the end 6 of shaft 7. This screw 12 which is designed to hold the plate 9 in place on shaft 7, is locked by two lock-washers 13 in the example represented although it could be locked by any other means. In plate 9, on either side of, and at equal distances from, the axial recess 10, and on a single axis meeting axis 11 and parallel to longitudinal axis 14 common to the two blades 3 and 4 (which is also the longitudinal axis of symmetry of strip 2), two identical bores 15 are sunk.

The hub of the rotor comprises, aside from the lower plate 9, an upper plate 16 parallel to the lower plate 9 and to the median plane P of the spar 2. The upper plate 16 is also pierced with two bores 17, identical to each other and to bores 15 opposite which they are situated. The two plates 9 and 16, of the same contour. The spar 2 passes symmetrically therebetween, reinforced in the zone of the hub by its two soles 5, the plates 9 and 16, and the spar 2 are linked together by four bolts 18 disposed in pairs on either side of the spar; the spacing between the plates being defined by four tubular braces 19, in which the bolts 18 pass.

A linkage offering a certain elasticity is insured, between spar 2 constituting the stringer common to the two blades 3 and 4, and the two plates 9 and 16, forming the part of the hub solid with the rotor shaft 7, by two sets 20 of laminated studs having conical active zone. These two sets of studs 20 are each composed of an upper laminated stud 20a and a lower one 20b, lodged respectively in bores 17 and 15 formed in plates 16 and 9 of the hub. These studs, of identical constitution, are disposed symmetrically to the horizontal plane P. The conical active zones of the two studs 20a and 20b in a given assembly 20, therefore have their opposing apexes situated on the same vertical axis 21, perpendicular to plane P of the spar and parallel to the axis of rotation 11 of the rotor.

Each laminated stud such as 20b, for example, is constituted by an outer element $20b_1$ having a cylindrical outer wall bearing an annular shoulder $20b_2$, resting on the edge of bore 15 of lower plate 9, and by an inner element $20b_3$; having an inner cylindrical wall. The inner walls of element 20b, and $20b_3$ are parallel facing one another and inclined to the axis 21. There is disposed a truncated metal cap $20b_4$ between two layers $20b_5$ of supple material such as rubber or elastomer, fixed with the inclined inner walls of the inner and outer elements.

The laminated studs 20a and 20b in a given set are linked together by bushings 22 perpendicular to spar 2, and passing through it, as well as through the inner elements of the studs, to form braces in which holding bolts 23 pass to insure that the studs are held tightly against strip 2 by contact with the strip of the ends of their inner elements the outer elements, however, are not in contact with strip 2. In the example represented, the laminated studs 20a and 20b have a single metal cap, and two layers of supple material. It is also possible, however, to use laminated studs provided with more than a single layer, according to the degree of elasticity desired in the linkage.

The second linkage between blades and rotor shaft is constituted by a ball-joint supporting the root of the blade on the hub. The ball-joint is situated for each blade, substantially in the vertical plane containing the axis 21 of the corresponding set of two laminated studs and perpendicular to the longitudinal axis 14 of the spar.

The blade shells 3 and 4 evolve gradually toward the center of the rotor to form a cylindrical sleeve solid with a rigid base 24 on which there is fixed an outer fork 25 forming a pitch lever controlling the incidence of the blade.

As seen in FIG. 3, on the base 24 of each blade there is fixed, by bolting, a collar 26 constituted in two parts, the junction being made in the plane P of the blade. The collar has an inner spherical surface 26a limited to a zone extending on either side of the plane containing the axis 21 of the two corresponding studs and their bolt 23, and centered on center A of the passage hole for the bolt and of the brace 22, formed in the spar. Inside the spherical surface 26a of collar 26 is lodged an annular piece 27 made of self-lubricating material, such as polyamide, in the form of a circular channel coaxial to axis 14 of spar 2. This piece 27 is also made in two parts symmetrical with junction plane in plane P of the spar, and has a small inner recess 27a (FIG. 3) at the location of bolt 23 to make room for the head of the nut tightening the bolt. The convex back of piece 27 is in mild friction contact with spherical surface 26a of collar 26. The inner groove of piece 27 serves as a lodging for an elastic toric ring 28, made of elastomer for example, holding piece 27 against spherical surface 26a and allowing a take-up for play and wear.

Piece 27 and ring 28, together constitute a composite hoop forming a ball-joint and journal. This hoop is disposed with slight prestress on the inside of a groove formed on the perimeter of a ring 29 made, like collar 26, of two half-rings with the junction plane in the plane P of the spar. These two half-rings are held in place in one case by the head of bolt 23 and in the other by the nut tightening the bolt, recesses formed in the latter at the point of axis 21, making it possible to lodge the head and the nut of the bolt. These half-rings rest on the lateral walls of spar 2 and its reinforcing soles 5, due to shoulders 29a disposed for this purpose.

The assembly of the various elements in the arrangement described, is accomplished in a very simple manner, in the following order:

Attachment of lower plate 9 on end 6 of rotor driveshaft 7 by means of screw 12, Installation of laminated studs 20b in bores 15 in plate 9, Installation of spar 2 previously equipped with the two shells 3, 4 and bases 24, Installation of laminated studs 20a on the spar and of upper plate 16 with engagement of these studs in bores 17 in the plate, Installation of braces 19 and linkage of the two plates by bolts 18, Installation of brace sleeves 22, Installation of two half-rings 29, Installation of bolts 23 with their nuts, Installation of composite hoops (piece 27 and ring 28) in the groove in ring 29, Installation of two half-collars 26 around the composite hoops, and attachment of the latter on rigid bases 24.

Disassembly is accomplished without difficulty by proceeding in the reverse order, so that access to any piece in the arrangement is very easy and rapid.

When the rotor is working, the various movement of each of the blades (incidence, flutter and, to a slight degree, drag) all take place around the corresponding point A, each blade root resting on the hub by means of the ball-joint with center A formed by collar 26 in sliding cooperation with composite hoop 27, 28. Moreover, at the level of the linkage of spar 2 with plates 9 and 16, hence of the blades with the hub, the laminated studs 20a and 20b impart a certain suppleness and insure a linkage by semi-embedment, which considerably reduces the level of the flutter and drag stresses in the spar at the ends of its reinforcements 5, but still permits transmission of the motor torque, as well as the forces and moments arising from the movements of the blades.

Figure 4:
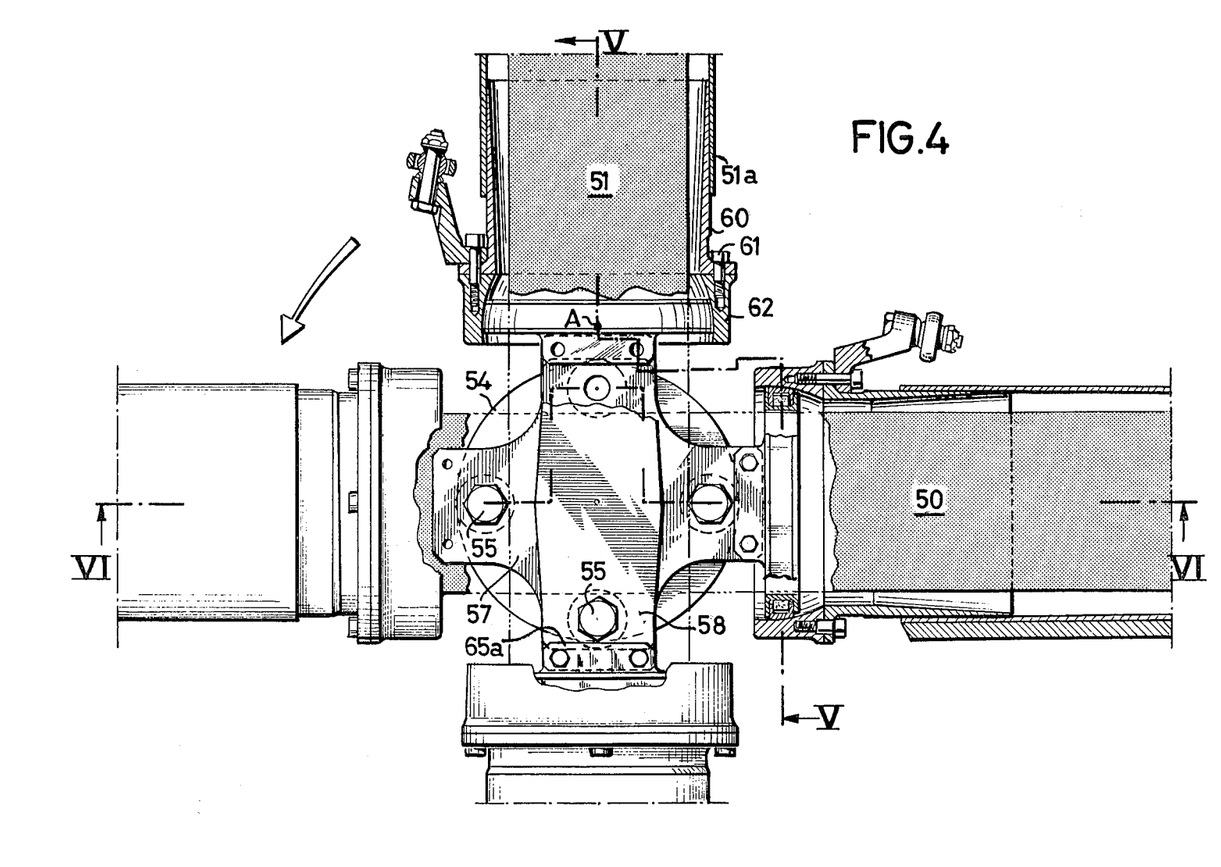
FIG. 4 is a plan view partially cut away of another form according to the invention.
Figure 5:
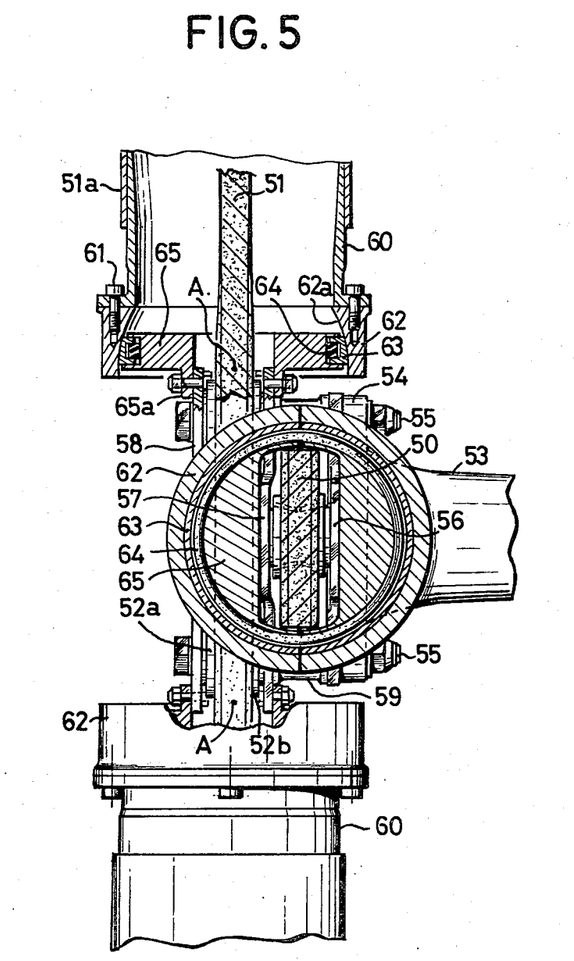
FIG. 5 is a section along line V—V of FIG. 4.
Figure 6:
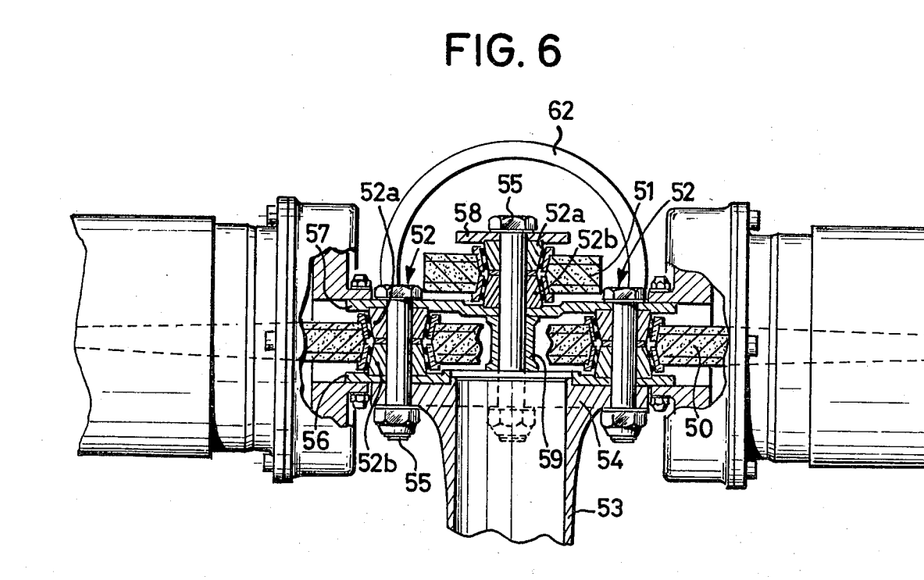
FIG. 6 is a section along line VI—VI of FIG. 4.

FIGS. 4 to 6 show a supple mounting arrangement according to the invention used on a four-blade rotor having two crossed through-spars 50 and 51. The thickness of the blades of this rotor in their central, reinforced part, is sufficient to permit the lodging therein of conical, laminated studs 52a,b, similar in structure to those of the laminated studs described above. In this variation of embodiment, rotor shaft 53 is terminated at its end in a circular expansion 54, on which the rotor assembly is fixed by four bolts 55. The first spar 50 is linked to an expansion member 54 of shaft 53 and held in place between two cruciform plates 56 and 57 by means of two sets each of two laminated studs 52a,b resting directly in spar 50, and of two of the four through-bolts 55. The second spar 51 is likewise linked to rotor shaft 53 and held in place between plate 57 and a plate 58, likewise by two sets each of conical, laminated studs 52a,b traversed by the other two bolts 55 with interposition, at the point of each of these two bolts, between plates 56 and 57, of a brace 59.

This supple mounting is likewise associated, as is the preceding two-blade rotor, with a ball-joint support device for the blade foot. On a cylindrical flange 60, solid with a blade shell such as 51a, there is fixed by bolting 61 a collar 62 in two parts. This collar on the inside presents a face 62a in the form of a spherical zone, slightly offset toward the outside, relative to center A of the sphere, on which there rests a composite hoop forming a journal and constituted by an annular piece 63 in the form of a channel, and a supple ring 64, made of elastomer, for example, between which a metal ring can be interposed. The composite hoop thus formed is borne by a ring 65, likewise in two parts (as in piece 63), each of them having an extension 65a for its attachment, respectively, on a prolongation of plates 56 and 57, on the one hand, and on a prolongation of plate 57 and plate 58 on the other. It is by these extensions that rings 65 are fixed to the hub, namely, the rings surrounding the first spar 50, to prolongations of plates 56 and 57, and the rings surrounding the second spar 51, to prolongations of plate 57 and plate 58. As in the preceding example, the ball-joint supports thus constituted allow the blades to execute movements of incidence around the longitudinal axis of their respective strip 50, 51, as well as movements of drag and flutter around center A of the corresponding joint, situated on the said axis and merged with the center of pseudo-articulation of the corresponding spar.

The variation of execution just described for a flur-blade rotor can also be used in the case of a two-blade rotor.

I claim:

1. A helicopter rotor comprising a driveshaft, a hub secured to the end of said driveshaft comprising a pair of spaced plates arranged parallel to each other and perpendicular to the axis of rotation of said driveshaft, a rotor blade assembly comprising at least one pair of opposed blades formed by a common stringer having a central portion passing between the spaced plates of said hub and oppositely extending spars and a shaped blade shell surrounding each of said spars and connected thereto solely in the area of the outer end thereof and extending inwardly toward the central portion of the stringer progressively evolving in cross-section into a cylindrical sleeve proximate said hub, and means for resiliently mounting said blade assembly to said hub comprising two pair of conically laminated elastic stud means, the stud means of each pair being interposed in opposition to each other on either side of said stringer between said stringer and the corresponding one of the plates of said hub, said pair of stud means being arranged symmetrically with respect to and extending parallel to the axis of rotation of the driveshaft, and a resilient ball joint arranged between the cylindrical sleeve of each of said blade shells and the plates forming said hub.

2. The rotor according to claim 1 wherein each stud comprises an inner conical element and an outer conical element, the elements in each pair of studs being disposed coaxially about a common axis perpendicular to the median plane of said stringer with one end of the inner elements resting on said stringer and the opposite end of the outer elements resting on the corresponding plate of the hub.

3. The rotor according to claim 2, wherein said opposed plates and stringer are formed with a through-bore concentric with said common axis for said studs and said outer element of each stud is provided with an annular shoulder, said outer element passing through the through-bore in the corresponding plate and resting by its shoulder thereon, and a bolt passing through said plate and studs to secure said plates, studs and stringer.

4. The rotor according to claim 3 including a cylindrical spacer passing through said plate and studs to maintain said plate and stringer spaced from each other.

5. The rotor according to claim 3 including cylindrical spaces passing through said studs and resting between said respective plates and stringer to main said stringers and plates spaced from each other.

6. The rotor according to claim 2 wherein said opposed plates and stringer are formed with a through-bore concentric with said common axis for said studs and said outer element of each stud is provided with an annular shoulder, said outer element passing through the through-bore in said stringer and resting by its shoulder thereon, and bolt means extending through said plate and studs to secure said plates, studs and stringer.

7. The rotor according to any one of claims 1 to 6 in which the ball joint comprises an annular collar fixed to the cylindrical shell of said rotor blade shell, an elastic circular loop located in functional engagement with the interior of said collar, and a ring borne by the hub located in functional engagement with the interior of said elastic ring.

8. The rotor according to claim 7 in which the ring is fixed directly to the plates of the hub.

9. The rotor according to claim 7 in which the ring is fixed directly central portion of said stringer.

10. The rotor according to claim 7 wherein said loop comprises a circular channel formed of a resilient self-lubricating material, and includes an elastic seal ring located in said channel.

11. The rotor according to claim 7 in which the collar and ring are formed of two semi-circular halves.

* * * * *